(12) United States Patent
Bialek et al.

(10) Patent No.: US 12,517,676 B2
(45) Date of Patent: *Jan. 6, 2026

(54) SOFTWARE MEMORY TAGGING FOR HEAP OVERFLOW PROTECTION

(71) Applicant: Microsoft Technology Licensing, LLC, Redmond, WA (US)

(72) Inventors: Joseph Norman Bialek, Seattle, WA (US); Matthew John Parkinson, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,829

(22) Filed: Nov. 6, 2023

(65) Prior Publication Data
US 2024/0069797 A1    Feb. 29, 2024

Related U.S. Application Data

(63) Continuation of application No. 17/315,516, filed on May 10, 2021, now Pat. No. 11,853,598.

(51) Int. Cl.
*G06F 3/06* (2006.01)

(52) U.S. Cl.
CPC .......... *G06F 3/0656* (2013.01); *G06F 3/0604* (2013.01); *G06F 3/0676* (2013.01); *G06F 3/0677* (2013.01); *G06F 3/0679* (2013.01)

(58) Field of Classification Search
CPC .. G06F 12/14; G06F 12/1425; G06F 12/1483; G06F 12/0684; G06F 21/52; G06F 3/0656; G06F 3/0604; G06F 3/0676; G06F 3/0677; G06F 3/0679
See application file for complete search history.

(56) References Cited

U.S. PATENT DOCUMENTS

| | | | | |
|---|---|---|---|---|
| 2008/0133858 | A1* | 6/2008 | Enbody | G06F 21/52 |
| | | | | 711/E12.091 |
| 2008/0140884 | A1* | 6/2008 | Enbody | G06F 21/54 |
| | | | | 710/57 |
| 2012/0278665 | A1* | 11/2012 | Serebryany | G06F 11/366 |
| | | | | 714/53 |

(Continued)

OTHER PUBLICATIONS

Chiamwongpaet, S. and Piromsopa, K., 2020. Boundary Bit: Architectural Bound Checking for Buffer-Overflow Protection. ECTI Transactions on Computer and Information Technology (ECTI-CIT), 14(2), pp. 162-173.*

(Continued)

*Primary Examiner* — Tracy A Warren
(74) *Attorney, Agent, or Firm* — Schwegman Lundberg & Woessner, P.A.

(57) ABSTRACT

Generally discussed herein are devices, systems, and methods for software memory tagging that provides buffer overflow protection. A method can include responsive to a memory write operation to write data to a heap of a memory, identifying a first tag value associated with a first address of the memory write operation in the bit map, comparing, for each address after the first address affected by the memory write operation, respective tag values in a bit map of the memory to the identified first tag value, and halting execution of the application if any of the respective tag values do not match the first tag value.

20 Claims, 5 Drawing Sheets

(56) References Cited

U.S. PATENT DOCUMENTS

2019/0354508 A1* 11/2019 Mahurin ............. G06F 9/30036
2020/0249852 A1* 8/2020 Moore .................. G06F 3/0631

OTHER PUBLICATIONS

GeeksforGeeks, 2017, "memcpy() in C/C++," available: https://web.archive.org/web/20201202232231/https://www.geeksforgeeks.org/memcpy-in-cc/.*

Piromsopa, K. and Enbody, R.J., 2006. Secure bit: Transparent, hardware buffer-overflow protection. IEEE Transactions on Dependable and Secure Computing, 3(4), pp. 365-376.*

Rao, J., He, Z., Xu, S., Dai, K. and Zou, X., 2016. BFWindow: speculatively checking data property consistency against buffer overflow attacks. IEICE Transactions on Information and Systems, 99(8), pp. 2002-2009.*

EPO Notification Rule 71(3) received in European Application No. 22721560.5, mailed on Sep. 13, 2024, 7 pages.

Decision to Grant pursuant to Article 97(1) Received for European Application No. 22721560.5, mailed on Jan. 7, 2025, 2 pages.

* cited by examiner

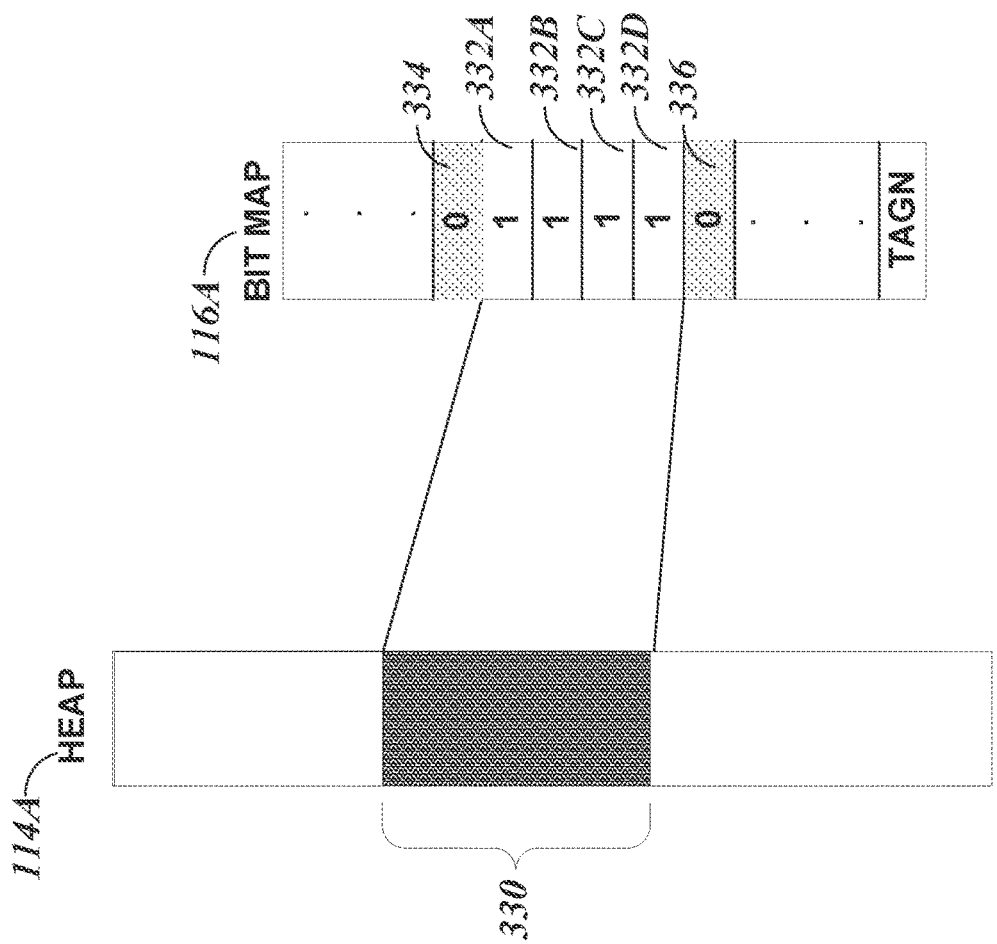
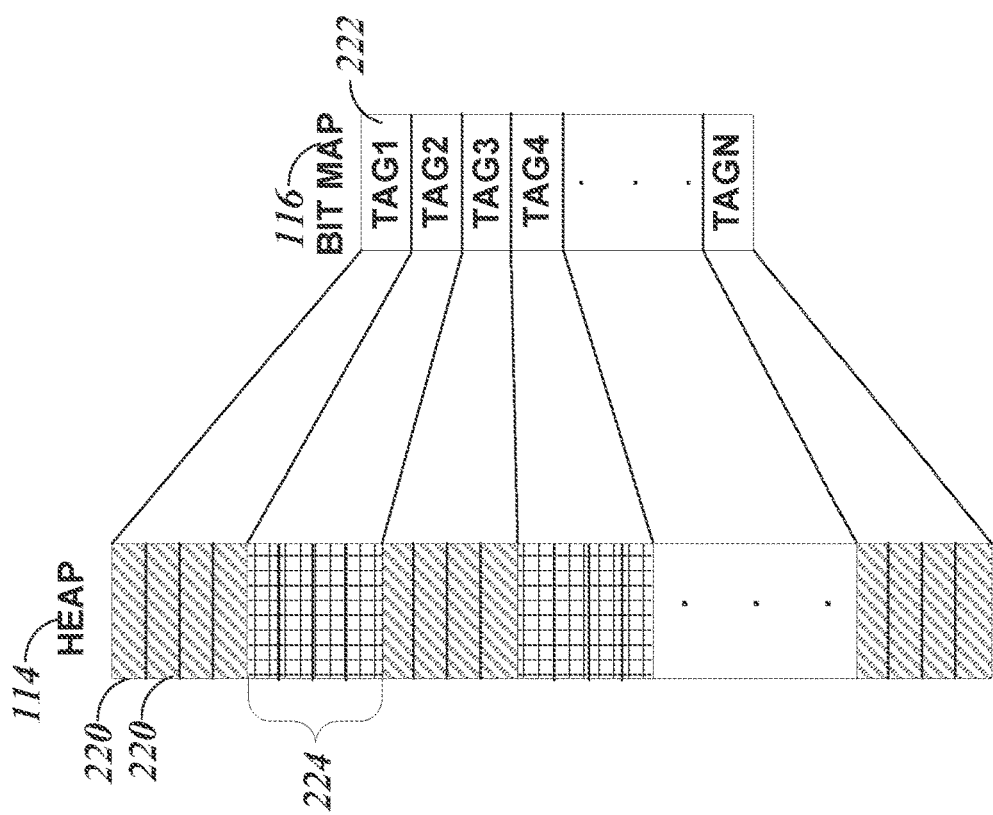
FIG. 3
FIG. 2

SOFTWARE MEMORY TAGGING FOR HEAP OVERFLOW PROTECTION

CROSS-REFERENCE TO RELATED APPLICATIONS

This application is a continuation of prior U.S. application Ser. No. 17/315,516, filed on May 10, 2021, which is incorporated by reference herein in its entirety.

BACKGROUND

Buffer overflow occurs when data written to a buffer (a section of memory, such as a runtime allocation) corrupts data values in memory addresses adjacent to the destination buffer. The buffer overflow can occur when there is insufficient bounds checking of a memory write operation. Buffer overflow can be prevented by checking that the data to be written fits in the destination buffer.

SUMMARY

Solutions to buffer overflow protection provided herein improve upon prior buffer overflow techniques. Aspects provide a software-based buffer overflow solution that has limited memory and processing overhead. Aspects can include maintaining a first address space comprising a plurality of disjoint heap memory allocations, a second, different address space dedicated to storing a bit map defining tag values of the first address space, and a third, different address space dedicated to storing instructions of a software application that, when executed by processing circuitry cause the processing circuitry to perform operations for buffer overflow protection. The operations can include, responsive to a memory write operation that includes writing data to the heap, identifying a first tag value, in the bit map, associated with a first address of the memory write operation in the bit map. The operations can include comparing, for each address after the first address affected by the memory write operation, respective tag values to the identified first tag value. The operations can further include halting execution of the application if any of the respective tag values do not match the first tag value. The bit map can be maintained such that immediately adjacent heap memory allocations are associated with different tag values. Thus, if a tag mismatch occurs, that means the write operation has overflowed to a different buffer.

A method, device, or machine-readable medium for software-based buffer overflow protection can perform operations including responsive to a memory write operation to write data to a heap of a memory, identifying a first tag value associated with a first address of the memory write operation in the bit map, for each address after the first address affected by the memory write operation, respective tag values in a bit map of the memory to the identified first tag value, and halting execution of the application if any of the respective tag values do not match the first tag value. The method, device, or machine-readable medium can further include maintaining by a runtime environment, the bit map (i) sets tag values, in the bit map, for all addresses in the heap memory allocation to the first tag value, and (ii) sets tag values, in the bit map, for a heap memory allocation immediately adjacent to the heap memory allocation, to a second, different tag value.

The method, device, or machine-readable medium can further include, wherein each of the tag values are a single bit. The method, device, or machine-readable medium can further include, wherein the addresses of each minimum memory allocation by the runtime environment include equal tag values associated therewith. The method, device, or machine-readable medium can further include, wherein the runtime stores only a single bit tag value in the bit map for each minimum memory allocation.

The method, device, or machine-readable medium can further include, wherein the write operation is memcpy. The method, device, or machine-readable medium can further include, wherein the operations further comprise, loading and comparing tag values to the first tag value interleaved with data being written such that both comparing and writing happen in parallel. The method, device, or machine-readable medium can further include, wherein multiple tag values are loaded with a single load operation and all of the multiple tag values are compared at once using a single compare.

The method, device, or machine-readable medium can further include storing heap metadata in line with the heap allocation, the heap metadata stored immediately before a heap allocation in the first address space and associated with a different tag value in the bit map than a corresponding heap allocation. The method, device, or machine-readable medium can further include storing heap metadata out of line with the heap allocation.

BRIEF DESCRIPTION OF DRAWINGS

FIG. 2 illustrates, by way of example, a block diagram of an embodiment of a bit map mapping of a heap.

FIG. 3 illustrates, by way of example, a block diagram of an embodiment of a specific bit map mapping of a heap.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

Figure 1:
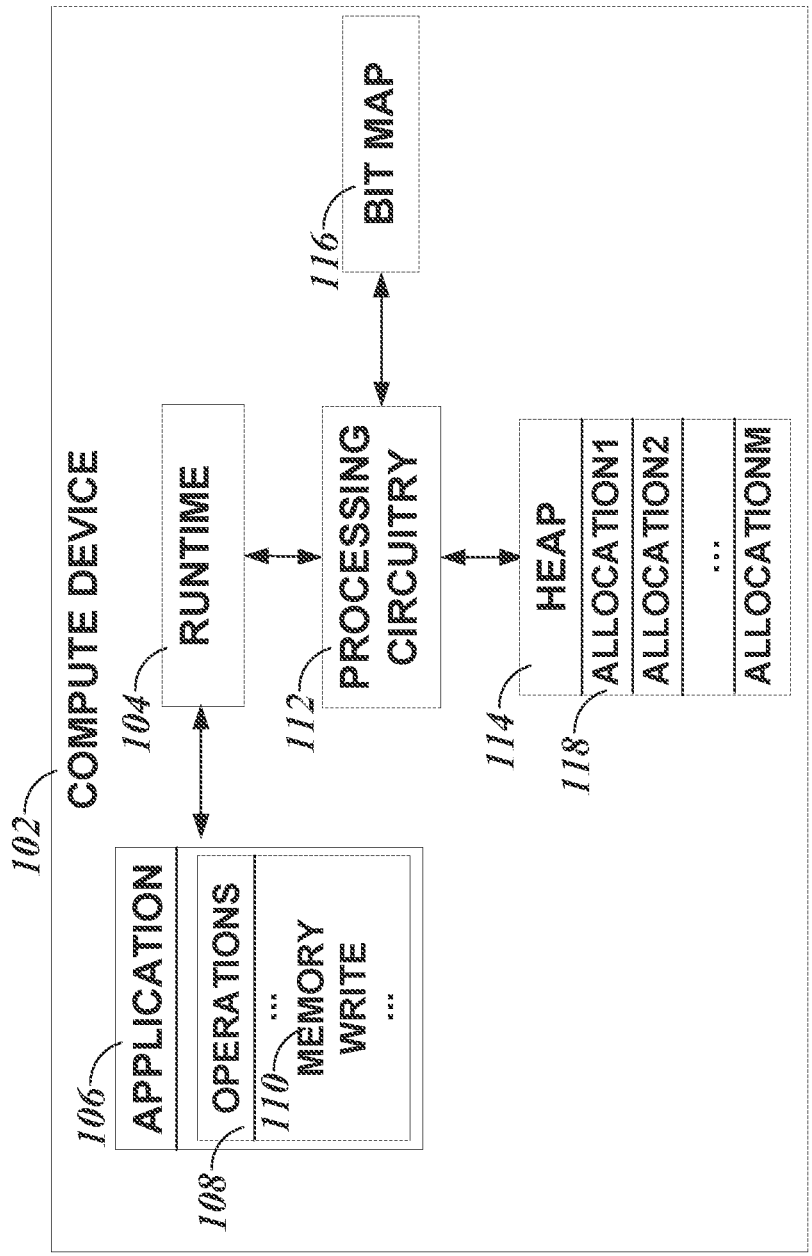
FIG. 1 illustrates, by way of example, a block diagram of an embodiment of a compute device with buffer overflow protection.

FIG. 1 illustrates, by way of example, a diagram of an embodiment of a compute device 102 with buffer overflow protection. The compute device 102 as illustrated includes a runtime environment 104, an application 106, processing circuitry 112, a heap 114, and a bit map 116. The runtime environment 104 can facilitate application 106 access to the processing circuitry 112. The processing circuitry 112 can include hardware that interfaces between the runtime environment 104 and the one or more memory devices that include the heap 114 and the bit map 116.

The runtime environment 104 includes the operating system (OS), a library for programming language support, or other components for managing the heap 114 and the bit map 116. The runtime environment manages memory of the application 106, how the application 106 accesses variables, and how the application 106 interfaces with the OS. The runtime environment 104 can perform garbage collection, manage one or more threads, or handle other dynamic features of a programming language.

The application 106 is software designed to help people perform an activity. Depending on the activity for which it was designed, an application can manipulate a visual display, text, number, audio, graphic, or a combination thereof. The application 106 is typically implemented by processing circuitry 112 executing instructions that implement operations 108 of the application 106. The operations 108 can include a memory write operation 110. In performing a memory write operation 110, the runtime environment 104 allocates address space of a memory, referred to as a heap, to hold the data of the write operation 110. Sometimes the memory write operation 110 attempts to write to more address space than is allocated to the application 106 for the write operation 110. This causes some address space beyond that which was allocated to be overwritten. This is called a buffer overflow. Note that "buffer" in "buffer overflow" means an allocated space of memory. A location in memory that can be allocated for random access is a part of what is called a "heap".

An attacker can exploit a buffer overflow to cause the application 106 to perform operations beyond those intended by the developer or user. By intelligently populating the data in the overflow (memory space outside of the allocated space), an attacker can take control of the application 106 to cause it to perform operations desired by the attacker.

Others have attempted to address the buffer overflow problem in a variety of ways. Each of the solutions has its own drawbacks.

Hardware memory tagging is currently supported by advanced reduced instruction set computer (RISC) machines (ARM) central processing units (CPUs). In hardware memory tagging, the OS sets up a bit map in which each disjoint 4 bits of the bit map data is assigned to 16 bytes of a physical address space. Then, when heap allocations are made, the heap allocator chooses a 4 bit tag value and places that tag in all bit map locations that correspond to the heap allocation being made and the tag is encoded into an address pointer into the heap. When memory accesses occur, the CPU verifies that the tag encoded into the pointer matches the tags in the bit map for that allocation. If it does not match, then an exception is thrown that indicates the buffer overflow is thrown and the buffer overflow is detected. Hardware memory tagging is not compatible with 32-bit OS because there are not enough free bits in the pointer to implement the hardware memory tagging and there are different problems implementing hardware memory tagging in a 64-bit OS.

Another solution is page heap from Microsoft Corporation of Redmond, Washington. Page heap allocates a guard page after each memory allocation leading to memory waste. When a write tries to access the guard page, a permissions exception is thrown and the buffer overflow is detected.

Another solution is provided by an address sanitizer (ASAN), which is an opensource memory checking tool. ASAN determines which memory locations are being written to by a write instruction and individually verifies that each memory location is a part of the same allocation before performing a heap write operation. ASAN has a performance degradation that increases linearly with a size of a memcpy.

The solutions provided herein are sometimes called "software memory tagging". Software memory tagging does not use bits of the address pointer as in the hardware memory tagging solution and is compatible with 32-bit and 64-bit software. Software memory tagging solutions consume less heap memory than page heap and, for the most part, the heap layout and density is generally unaffected. Further, instead of checking whether all addresses of a write operation are associated with a same heap allocation up front, software memory tagging enables performance of heap allocation checks in line with a write operation. Software memory tagging has a fixed-cost to compute where in the bit map 116 the corresponding tags of the heap 114 addresses being written are stored. However, as a size of the amount of data being written increases, the overhead of the tag checking in software memory tagging, as a percentage overhead of total cost approaches zero. For example, consider a memcpy (memory copy) write operation that copies data from one location in memory to another location in memory. For a memcpy of about 4096 bytes, the overhead is under 5%. For sizes in more typical ranges of 64-256 bytes, the overhead is around 30%.

Operations 108 are one or more instructions executed by the processing circuitry 112 in performing the functionality of the application 106. The operations 108 can include memory write operations 110. A memory write operation 110 is an operation that loads data to a memory address in the heap 114. Examples of write operations include memcpy, load, put, among others. A write operation can include read instructions, data manipulation instructions (e.g., shift, multiply, add, concatenate, subtract, divide, among others) as long as the operation includes a write instruction. Memcpy is an example of a write operation that reads data from a first location and loads the data into a second location.

The processing circuitry 112 includes the hardware on which the runtime environment 104 operates. The processing circuitry 112 can include one or more electric or electronic components configured to provide functionality of the compute device 102. The electric or electronic components can include one or more resistors, transistors, capacitors, diodes, inductors, switches, oscillators, amplifiers, power supplies, regulators, analog to digital converters, digital to analog converters, multiplexers, logic gates (e.g., AND, OR, XOR, negate, buffer, or a combination thereof), processing units (e.g., application specific integrated circuits (ASICs), field programmable gate arrays (FPGAs), central processing units (CPUs), graphics processing units (GPUs), or the like), memories, or the like.

The heap 114 is a portion of memory that is dedicated for allocation to the application 106 or another application executing on the compute device 102. The runtime environment 104 can manage the heap 114. Managing the heap 114 can include allocating memory to the application 106. An allocation 118 of memory can have a minimum size. In some current OS implementations, the minimum amount of memory that can be allocated is 16 bytes. Other minimum memory allocations are possible, and 16 bytes is merely an example.

The bit map 116 can include data that provides a high level snapshot of the state of the heap 114. The bit map 116 can be managed by the runtime environment 104. Each bit in the bit map 116 can represent a specified amount of data in the heap 114. Each single bit in the bit map 116 can, for example, represent the minimum memory allocation, which can be 16 bytes.

The bit map 116 can be structured such that respective bits corresponding to a new memory allocation (with maximum size constrained by a write operation) are all equal to the same value. The bit map 116 can be further structured such that all prior allocations immediately adjacent to the new memory allocation (a memory allocation immediately prior if there is one and immediately after the memory allocation if there is one) in the heap 114 are associated with respective bits in the bit map 116 that are not equal to the respective bits of the new memory allocation. This is illustrated in and discussed in more detail regarding FIGS. 2-5.

The allocation 118 is a section of memory that the runtime environment 104 has allowed the application 106 to access in performing its operations 108. The allocation 118 has a minimum memory size that is constrained by a minimum allocation that can be performed by the runtime environment 104. As previously discussed, this can be 16 bytes. The allocation 118 has a maximum memory size that is constrained by a maximum amount of data that can be written to the heap 114 using the write operation 110 or can be constrained by the programming of the runtime environment 104.

FIG. 2 illustrates, by way of example, a diagram of an embodiment of a bit map 116 mapping of the heap 114. The heap 114 includes individual memory addresses 220. The compute device 102 can store a specified amount of data (e.g., typical amounts of data are 8, 16, 32, 64, 128, or 256 bits) at the memory location corresponding to the address. The runtime environment 104 can associate a specified number of addresses 220 with an individual tag value (represented by tag 1 222). The tag value can be a single bit, such that the value of the tag 222 is either "1" or "0". Keeping the tag value to a single bit can help minimize an amount of memory required to store the bit map 116. The tag values are used for buffer overflow protection.

As previously suggested, a number (one or greater) of the addresses 220 can be represented by a single tag 222. The number of addresses 220 can correspond to the minimum memory allocation that the runtime environment 104 can make. The allocations 224 span multiple addresses that represent an example of the minimum memory allocation. The minimum memory allocation can be 16 bytes and 1 bit of bitmap data can correspond to 16 bytes.

If the runtime environment 104 allocates more than the minimum memory allocation in a single allocation, the tags of both of those minimum memory allocations can have their corresponding tag values (the value assigned to the tag 222) set to the same value. FIG. 3 illustrates a specific bit map mapping that includes multiple minimum memory allocations 224 allocated in a single allocation.

FIG. 3 illustrates, by way of example, a diagram of an embodiment of a specific bit map 116A mapping of the heap 114. Note that a reference number with a suffix is a specific instance of the component that corresponds to the reference number without the suffix. Thus, the bit map 116A is a specific instance of the general bit map 116.

The illustrated heap 114 includes a memory allocation 330 that spans four minimum memory allocations 224. This is a simple, non-limiting example. To allow for buffer overflow detection, each tag value corresponding to an address immediately before (tag value 334) and immediately after (tag value 336) the address(es) of the allocation 330 can be set, by the runtime environment 104, to a different tag value 334, 336 ("0" in this example) than a tag value ("1" in this example) 332A, 332B, 332C, 332D corresponding to the addresses of the allocation 330. With this configuration, the processing circuitry 112 can (i) identify a tag value 332A corresponding to a first address of the write operation 110 and (ii) compare tag values 332B-332D corresponding to the rest of addresses of the write operation 110 to the identified tag value 332A. If the tag values 332A and one of 332B-332D are not equal, then a buffer overflow will occur if the write operation is allowed to complete. To stop the buffer overflow, the processing circuitry 112 or the runtime environment 104 can halt, pause, or terminate execution of the application 106.

Figure 4:
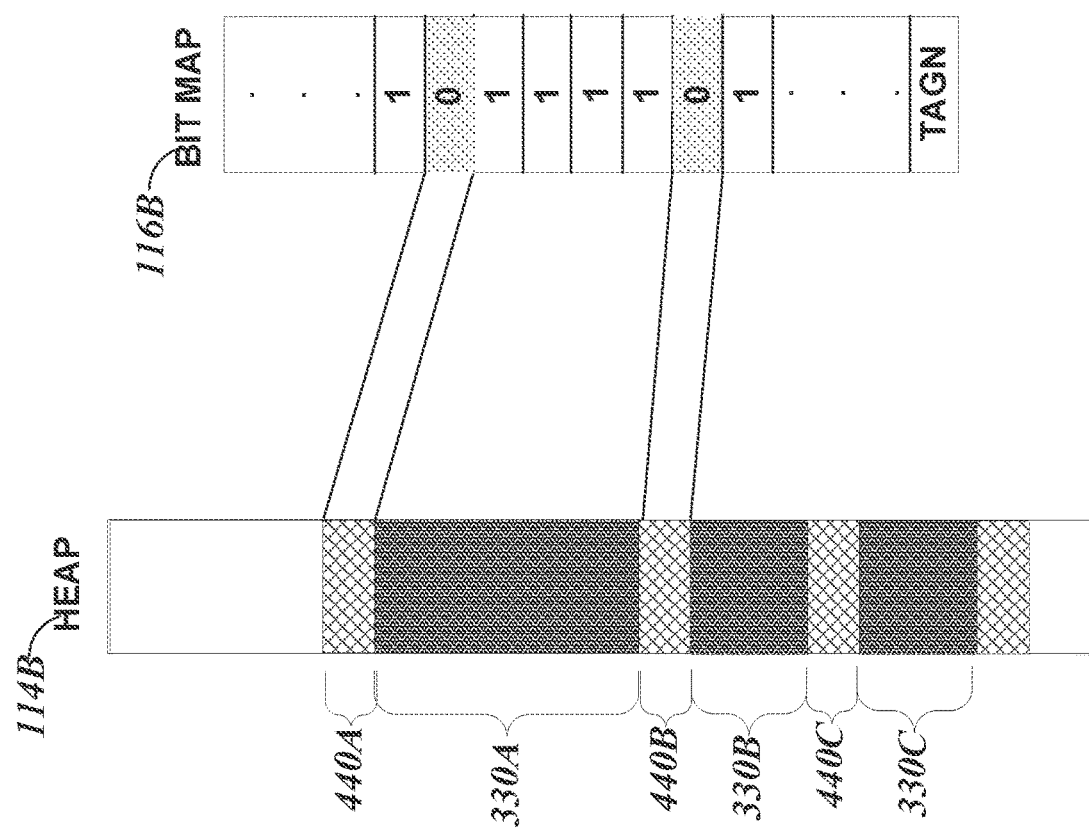
FIG. 4 illustrates, by way of example, a block diagram of an embodiment of a heap that includes metadata in line with data and a corresponding bit map.

FIG. 4 illustrates, by way of example, a diagram of an embodiment of a heap 114B that includes metadata 440A, 440B stored in line with data of respective allocations 330A, 330B and a corresponding bit map 116B. In line means that the metadata 440A, 440B is placed in the heap 114B immediately prior to the allocation 330A, 330B that the metadata 440A, 440B represents. The metadata 440A, 440B is sometimes called a block header. The metadata 440A, 440B includes data regarding the respective allocation 330A, 330B. The metadata 440A, 440B can include a starting address, a size of the allocation (e.g., in terms of bits or bytes, number of addresses, number of minimum memory allocations, starting and ending address, or the like), permissions for accessing the allocation (e.g., indicating an application that has permissions to access the allocation 330A, 330B), whether the allocation is free or allocated, or a combination thereof. The metadata can be used by the processing circuitry 112 or runtime environment 104 to determine a size of a given allocation.

Note that the first and last minimum memory allocations (sometimes called blocks) can be left unallocated (free). Respective tag values in the bit map 116 associated with the first and last blocks can be managed such that they are not equal to tag values associated with immediately adjacent allocations. Whether a portion of the heap 114 has been allocated can be managed by the runtime environment 104 in a page table. The page table is a data structure used by the runtime environment 104 that maps between virtual and physical addresses. Each entry in the page table can include a bit indicating whether the corresponding address is allocated or not.

Figure 5:
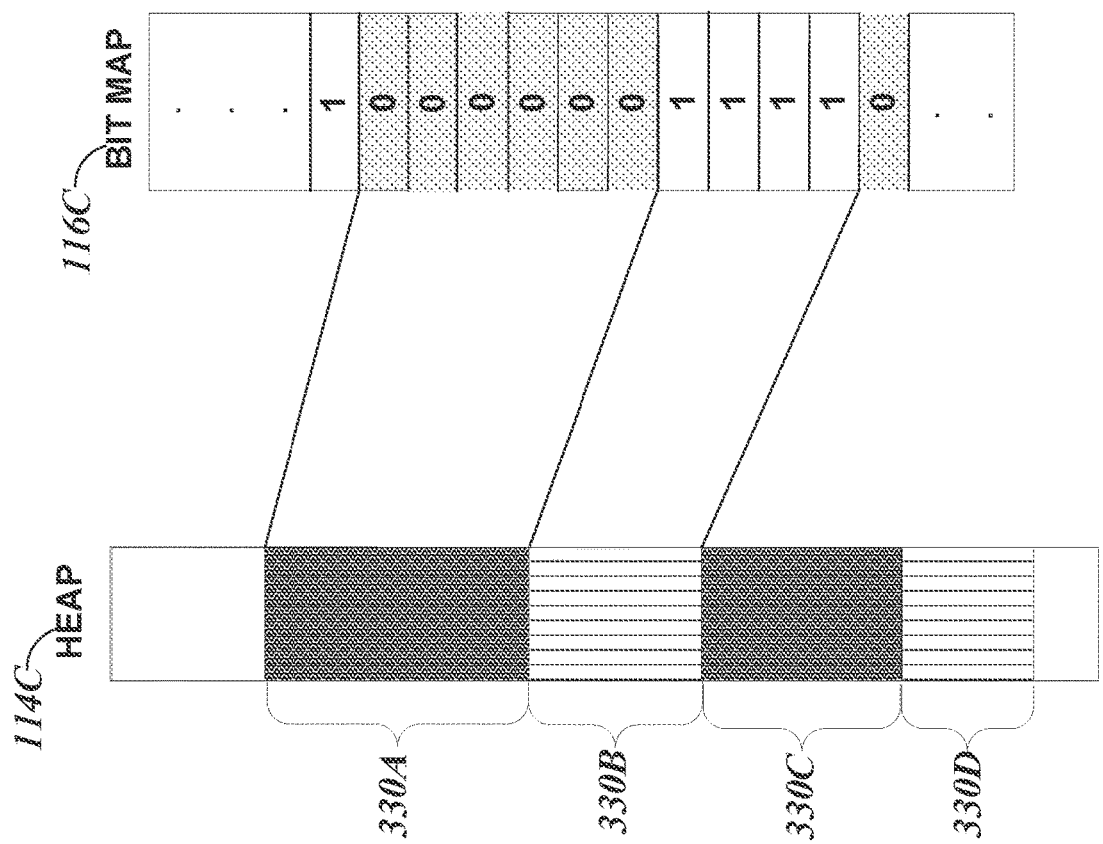
FIG. 5 illustrates, by way of example, a block diagram of an embodiment of a heap without inline metadata.

FIG. 5 illustrates, by way of example, a diagram of an embodiment of a heap 114C without inline metadata. The metadata for the heap 114C can be stored in an allocation 330A, 330B, 330C, 330D, it just is not required to store the metadata for a given allocation in an immediately prior allocation. The software memory tagging of embodiments is equally to applicable to the heap 114B with metadata 440A, 440B, 440C inline as well as not inline as in the heap 114C.

In an embodiment with inline metadata 440A-440C, the corresponding bit map 116B can include a different tag value for all metadata 440A-440C allocations than is used for all data allocations 330A-330C. In an embodiment with metadata that is not inline, a metadata allocation can have a same or different tag value in the bit map 116C as a corresponding data allocation.

Figure 6:
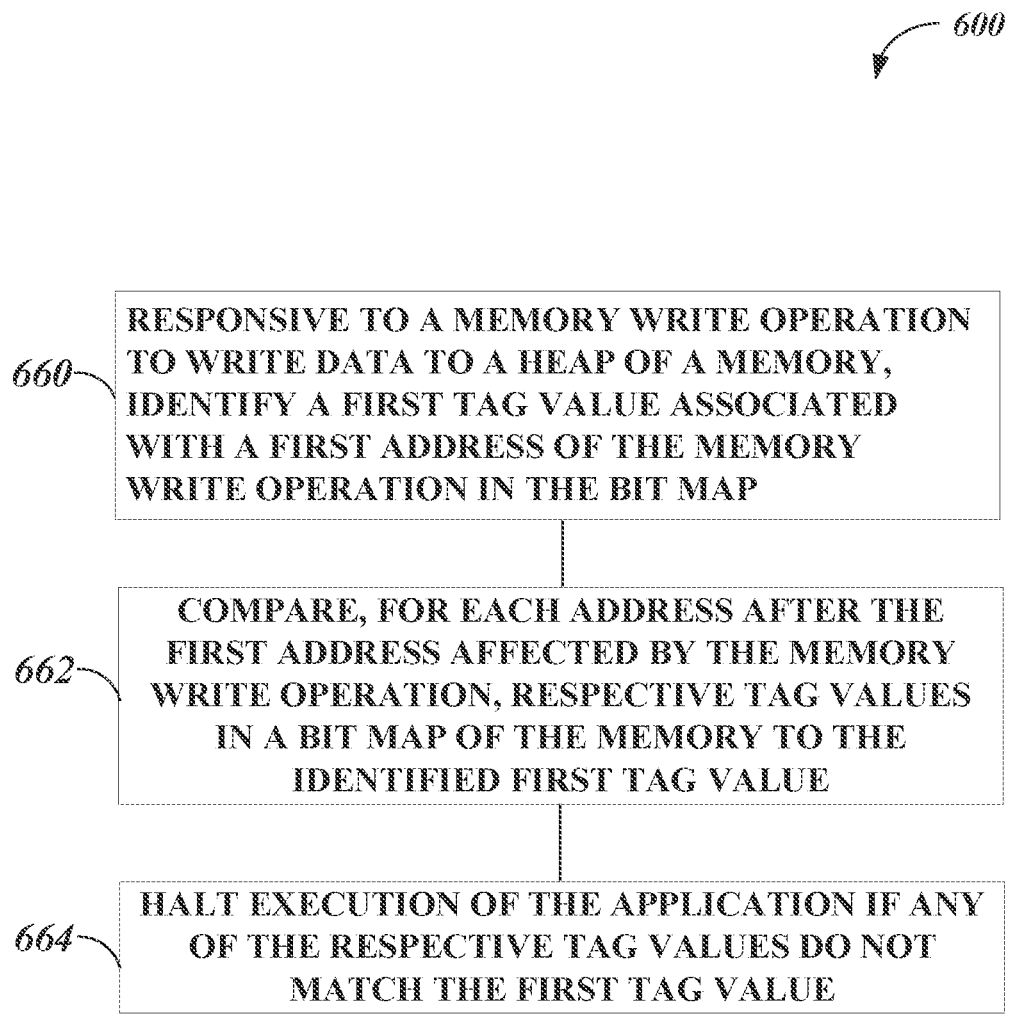
FIG. 6 illustrates, by way of example, a block diagram of a method for software-based buffer overflow protection.

FIG. 6 illustrates, by way of example, a diagram of a method 600 for software-based buffer overflow protection. The method 600 as illustrated includes responsive to a memory write operation to write data to a heap of a memory, identifying a first tag value associated with a first address of the memory write operation in the bit map, at operation 660; comparing, for each address after the first address affected by the memory write operation, respective tag values in a bit map of the memory to the identified first tag value, at operation 662; and halting execution of the application if any of the respective tag values do not match the first tag value, at operation 664.

The method 600 can further include maintaining by a runtime environment, the bit map (i) sets tag values, in the bit map, for all addresses in the heap memory allocation to the first tag value, and (ii) sets tag values, in the bit map, for a heap memory allocation immediately adjacent to the heap memory allocation, to a second, different tag value. The method 600 can further include, wherein each of the tag values are a single bit. The method 600 can further include, wherein the addresses of each minimum memory allocation by the runtime environment include equal tag values associated therewith. The method 600 can further include, wherein the runtime stores only a single bit tag value in the bit map for each minimum memory allocation.

The method 600 can further include, wherein the write operation is memcpy. The method 600 can further include, wherein the operations further comprise, loading and comparing tag values to the first tag value interleaved with data being written such that both comparing and writing happen in parallel. The method 600 can further include, wherein multiple tag values are loaded with a single load operation and all of the multiple tag values are compared at once using a single compare.

The method 600 can further include storing heap metadata in line with the heap allocation, the heap metadata stored immediately before a heap allocation in the first address space and associated with a different tag value in the bit map than a corresponding heap allocation. The method 600 can further include storing heap metadata out of line with the heap allocation.

Figure 7:
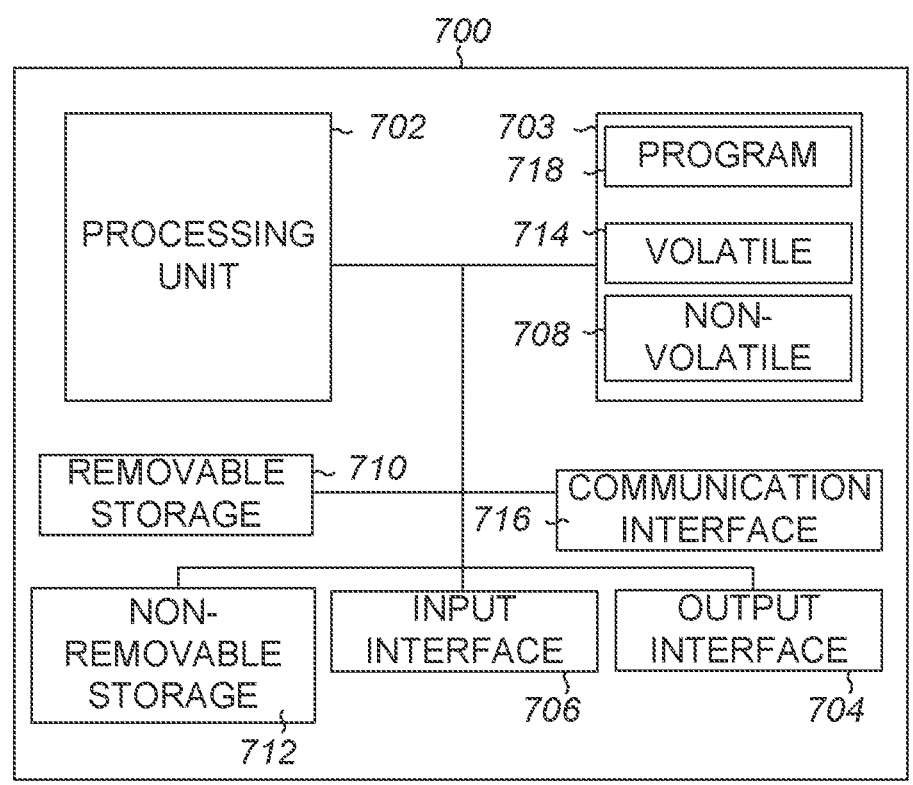
FIG. 7 illustrates, by way of example, a block diagram of an embodiment of a machine (e.g., a computer system) to implement one or more embodiments.

FIG. 7 illustrates, by way of example, a block diagram of an embodiment of a machine 700 (e.g., a computer system) to implement one or more embodiments. The machine 700 can implement a technique for software-based buffer overflow protection. The compute device 102, runtime environment 104, processing circuitry 112, or a component thereof can include one or more of the components of the machine 700. One or more of the compute device 102, application 106, runtime environment 104, processing circuitry 112, heap 114, bit map 116, method 600, or a component or operation thereof can be implemented, at least in part, using a component of the machine 700. One example machine 700 (in the form of a computer), may include a processing unit 702, memory 703, removable storage 710, and non-removable storage 712. Although the example computing device is illustrated and described as machine 700, the computing device may be in different forms in different embodiments. For example, the computing device may instead be a smartphone, a tablet, smartwatch, or other computing device including the same or similar elements as illustrated and described regarding FIG. 7. Devices such as smartphones, tablets, and smartwatches are generally collectively referred to as mobile devices. Further, although the various data storage elements are illustrated as part of the machine 700, the storage may also or alternatively include cloud-based storage accessible via a network, such as the Internet.

Memory 703 may include volatile memory 714 and non-volatile memory 708. The machine 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 700 may include or have access to a computing environment that includes input 706, output 704, and a communication connection 716. Output 704 may include a display device, such as a touchscreen, that also may serve as an input device. The input 706 may include one or more of a touchscreen, touchpad, mouse, keyboard, camera, one or more device-specific buttons, one or more sensors integrated within or coupled via wired or wireless data connections to the machine 700, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 702 (sometimes called processing circuitry) of the machine 700. A hard drive, CD-ROM, and RAM are some examples of articles including a non-transitory computer-readable medium such as a storage device. For example, a computer program 718 may be used to cause processing unit 702 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

ADDITIONAL NOTES AND EXAMPLES

Example 1 can include a compute device with buffer overflow protection, the compute device comprising processing circuitry, and a memory coupled to the processing circuitry, the memory comprising a first address space storing a heap comprising a plurality of disjoint heap memory allocations, a second, different address space storing a bit map defining tag values of the first address space, and a third, different address space storing instructions of a software application that, when executed by the processing circuitry cause the processing circuitry to perform operations comprising responsive to a memory write operation to write data to the heap, identify a first tag value associated with a first address of the memory write operation in the bit map, compare, for each address after the first address affected by the memory write operation, respective tag values to the identified first tag value, and halt execution of the application if any of the respective tag values do not match the first tag value.

In Example 2, Example 1 can further include a runtime environment that maintains the bit map and (i) sets tag values, in the bit map, for all addresses in the heap memory allocation to the first tag value, and (ii) sets tag values, in the bit map, for a heap memory allocation immediately adjacent to the heap memory allocation, to a second, different tag value.

In Example 3, Example 2 can further include, wherein each of the tag values are a single bit.

In Example 4, Example 3 can further include, wherein the addresses of each minimum memory allocation by the runtime include equal tag values associated therewith.

In Example 5, Example 4 can further include, wherein the runtime stores only a single bit tag value in the bit map for each minimum memory allocation.

In Example 6, at least one of Examples 1-5 can further include, wherein the write operation is memcpy.

In Example 7, Example 6 can further include, wherein the operations further comprise, loading and comparing tag values to the first tag value interleaved with data being written such that both comparing and writing happen in parallel.

In Example 8, Example 7 can further include, wherein multiple tag values are loaded with a single load operation and all of the multiple tag values are compared at once using a single compare.

In Example 9, at least one of Examples 1-8 can further include heap metadata stored in line with the heap allocation, the heap metadata stored immediately before a heap allocation in the first address space and associated with a different tag value in the bit map than a corresponding heap allocation.

In Example 10, at least one of Examples 1-9 can further include heap metadata stored out of line with the heap allocation.

Example 11 includes a method including performing the operations of at least one of Examples 1-10.

Example 12 includes a (non-transitory) machine-readable medium including instructions that, when executed by a machine cause the machine to perform operations of at least one of Examples 1-10.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A compute device with buffer overflow protection, the compute device comprising:
   processing circuitry;
   a memory coupled to the processing circuitry, the memory comprising (i) a heap comprising a plurality of disjoint heap memory allocations, (ii) a map defining tag values of the heap, the map includes (a) a plurality of first tag values, for addresses in a first heap memory allocation, set to a first tag value, and (b) a plurality of second tag values, for a second set of addresses in a second heap memory allocation, set to a second, different tag value, the plurality of first tag values directly adjacent to the plurality of second tag values in the map, and (iii) instructions of a software application that, when executed by the processing circuitry cause the processing circuitry to perform operations comprising:
   responsive to a memory write operation to write data to the heap, identify the first tag value of the tag values associated with a first address of the memory write operation in the map;
   compare, for each respective address of addresses after the first address and affected by the memory write operation, respective tag values of the tag values in the map associated with the respective addresses of the heap to the identified first tag value; and
   halt execution of the application if any of the respective tag values do not match the first tag value.

2. The compute device of claim 1, further comprising:
   a runtime environment that maintains the map and sets the plurality of first and second tag values.

3. The compute device of claim 2, wherein each of the tag values are a single bit.

4. The compute device of claim 3, wherein the addresses of each heap allocation of the disjoint heap memory allocations by the runtime include equal tag values associated therewith.

5. The compute device of claim 4, wherein the runtime stores only a single bit tag value in the map for each minimum memory allocation.

6. The compute device of claim 1, wherein the write operation is memcpy.

7. The compute device of claim 6, wherein the operations further comprise, loading and comparing the respective tag values to the first tag value interleaved with writing data to the disjoint heap memory allocation such that both (i) loading and comparing and (ii) writing happen in parallel.

8. The compute device of claim 7, wherein multiple tag values are loaded with a single load operation and all of the multiple tag values are compared at once using a single compare.

9. The compute device of claim 1, further comprising heap metadata stored in line with the disjoint heap memory allocations, the heap metadata stored immediately before a corresponding heap allocation of the disjoint heap memory allocations in the heap and associated with a different tag value in the map than the corresponding heap allocation.

10. The compute device of claim 1, further comprising heap metadata stored out of line with the disjoint heap memory allocations.

11. A method for buffer overflow protection, the method comprising:
    responsive to a memory write operation to write data to a heap of a memory, identify a first tag value of the tag values associated with a first address of the memory write operation in a map, the memory including (i) the heap comprising a plurality of disjoint heap memory allocations and (ii) the map defining tag values of the heap, the map includes (a) a plurality of first tag values, for addresses in a first heap memory allocation, set to the first tag value, and (b) a plurality of second tag values, for a second set of addresses in a second heap memory allocation, set to a second, different tag value, the plurality of first tag values directly adjacent to the plurality of second tag values in the map;

compare, for each respective address of the respective addresses after the first address affected by the memory write operation, respective tag values of the tag values associated with the respective addresses in the map to the identified first tag value; and halt execution of an application if any of the respective tag values do not match the first tag value.

12. The method of claim 11, further comprising:

maintaining by a runtime environment, the map sets the plurality of first and second tag values.

13. The method of claim 12, wherein each of the tag values are a single bit.

14. The method of claim 13, wherein the addresses of each heap allocation of heap memory allocations of the heap include equal tag values associated therewith.

15. The method of claim 14, wherein the runtime stores only a single bit tag value in the map for each minimum memory allocation.

16. The method of claim 11, wherein the write operation is memcpy.

17. The method of claim 16, wherein the operations further comprise, loading and comparing the respective tag values to the first tag value interleaved with writing data to the heap such that both (i) loading and comparing and (ii) writing happen in parallel.

18. The method of claim 17, wherein multiple tag values are loaded with a single load operation and all of the multiple tag values are compared at once using a single compare.

19. A non-transitory machine-readable medium including instructions that, when executed by a machine, cause the machine to perform operations for buffer overflow protection, the operations comprising:

responsive to a memory write operation to write data to a heap of a memory, identify a first tag value of the tag values associated with a first address of the memory write operation in a map, the memory including (i) the heap comprising a plurality of disjoint heap memory allocations and (ii) the map defining tag values of the heap, the map includes (a) a plurality of first tag values, for addresses in a first heap memory allocation, set to the first tag value, and (b) a plurality of second tag values, for a second set of addresses in a second heap memory allocation, set to a second, different tag value, the plurality of first tag values directly adjacent to the plurality of second tag values in the map;

compare, for each respective address of respective addresses after the first address affected by the memory write operation, respective tag values of the tag values associated with the respective addresses to the identified first tag value; and halt execution of an application if any of the respective tag values do not match the first tag value.

20. The non-transitory machine-readable medium of claim 19, further comprising heap metadata stored in line with heap memory allocations of the heap, the heap metadata stored immediately before a corresponding heap allocation of the heap memory allocations in the heap and associated with a different tag value in the map than a corresponding heap allocation.

* * * * *